(12) United States Patent
Takahashi et al.

(10) Patent No.: US 8,449,189 B2
(45) Date of Patent: May 28, 2013

(54) MOTOR WITH AERODYNAMIC PRESSURE BEARING MECHANISM

(75) Inventors: Akiyoshi Takahashi, Iruma (JP); Toshiya Uchida, Iruma (JP)

(73) Assignee: Nidec Copal Electronics Corporation, Tokyo (JP)

( * ) Notice: Subject to any disclaimer, the term of this patent is extended or adjusted under 35 U.S.C. 154(b) by 816 days.

(21) Appl. No.: 12/451,665

(22) PCT Filed: May 21, 2008

(86) PCT No.: PCT/JP2008/001264
§ 371 (c)(1),
(2), (4) Date: Nov. 24, 2009

(87) PCT Pub. No.: WO2008/146468
PCT Pub. Date: Dec. 4, 2008

(65) Prior Publication Data
US 2010/0166348 A1   Jul. 1, 2010

(30) Foreign Application Priority Data
May 25, 2007  (JP) .................. 2007-139463

(51) Int. Cl.
*F16C 32/06* (2006.01)
(52) U.S. Cl.
USPC ........................................... 384/115
(58) Field of Classification Search
USPC .................. 384/100, 109, 114, 115
See application file for complete search history.

(56) References Cited

U.S. PATENT DOCUMENTS

| | | | | |
|---|---|---|---|---|
| 5,675,200 A | * | 10/1997 | Hayashi | 310/90 |
| 5,746,515 A | * | 5/1998 | Takahashi et al. | 384/115 |
| 5,997,180 A | * | 12/1999 | Ishizuka et al. | 384/115 |
| 6,702,464 B1 | | 3/2004 | Takeuchi et al. | |

FOREIGN PATENT DOCUMENTS

| | | |
|---|---|---|
| JP | 09-210052 | 8/1997 |
| JP | 2000-092775 A | 3/2000 |
| JP | 2001-330026 | 11/2001 |
| WO | WO-01/06621 | 1/2001 |
| WO | WO-01/21969 | 3/2001 |
| WO | WO-01/21969 A1 | 3/2001 |

OTHER PUBLICATIONS

International Search Report dated Jul. 1, 2008 issued in PCT/JP2008/001264.
Office Action mailed Oct. 9, 2012, issued for the corresponding Japanese patenrt application No. 2007-139463.

* cited by examiner

*Primary Examiner* — Phillip A Johnson
(74) *Attorney, Agent, or Firm* — Edwards Wildman Palmer LLP

(57) ABSTRACT

In a gas dynamic pressure bearing mechanism (1) for smoothing rotary motion of a shaft (10) by feeding gas to the bearing clearance between the shaft (10) and a fixed sleeve (20) for supporting the shaft (10) through a herring bone groove (10*a*), the herring bone groove (10*a*) is provided in the shaft (10) such that pressure distribution generated in the bearing clearance moves at a high speed. The herring bone groove (10*a*) consists of N grooves such that N minimal pressure values appearing alternately with maximal pressure values at the positions where the maximal pressure values of dynamic pressure variation appear in the bearing clearance when the shaft (10) rotates have such an interval as it becomes lower than the condensation pressure value.

6 Claims, 13 Drawing Sheets

ROTATING AXIS DIRECTION

MAXIMUM PRESSURE SECTION (POSITION)

(a) STABLE STATE (b) UNSTABLE STATE

RELATIONSHIP BETWEEN PRESSURE DISTRIBUTION OVER TIME AND THE LOCATIONS OF CONDENSED LIQUID PARTICLES

RELATIONSHIP BETWEEN PRESSURE DISTRIBUTION OVER TIME AND THE LOCATIONS OF CONDENSED LIQUID PARTICLES

MOTOR WITH AERODYNAMIC PRESSURE BEARING MECHANISM

FIELD OF INVENTION

The present invention relates to a motor provided with an aerodynamic pressure bearing mechanism that causes smooth relative rotary motion between a rotating axis and a fixed member by generating aerodynamic pressure within the bearing clearance between the rotating axis and the fixed member. Although dew condensation may occur in the abovementioned bearing clearance due to dynamic pressure variation caused by rotation in an environment with a high ambient humidity, the present invention particularly relates to a technique for obtaining smooth rotary motion by preventing the condensation through a simple configuration of herring bone grooves.

BACKGROUND ART

Along with recent developments in information-technology related equipment, there has been demand for laser scanners and copiers for printing letters and images faster and more densely. For such speeding up and densification, a high-speed and stable rotation of polygon mirror for scanning a laser is necessary. In the most current laser scanner bearings, from the perspectives of rigidity and stability with respect to a high-speed whirl (HFW), an aerodynamic pressure bearing mechanism with herring bone (hereinafter accordingly abbreviated as "HB") grooves is used.

DISCLOSURE OF INVENTION

Problem to be Resolved by the Invention

However, in a conventional aerodynamic pressure bearing mechanism 200 with herring bone grooves, a herring bone groove 210a is usually formed in a fixed shaft 210 on the fixed side and a rotating sleeve 220 on the rotation side rotates as shown in FIG. 18(a), and it has a configuration in which many herring bone grooves 210a are intricately formed as shown in FIG. 18(b), causing the disadvantage of high production cost and results in demand for an aerodynamic pressure bearing mechanism that can be produced with a much simpler groove configuration and at low cost. In particular, laser scanner bearing mechanisms with a rotational frequency of 50 krpm (50,000 revolution/min) or more have also been developed.

However, there is also a strong demand for reductions in production cost as well as enhanced performance for such aerodynamic pressure bearing mechanisms, which are problematic in terms of production cost because many herring bone grooves are conventionally used.

On the other hand, with an aerodynamic pressure bearing mechanism that obtains rigidity and stability by increasing the gas pressure within the bearing using a pump, particularly in a high-temperature and high-humidity environment, vapor in the gas is condensed and liquefied through compression in a state of nearly isothermal compression (hereinafter referred to as "isothermal compression") due to changes in the dynamic pressure caused by rotation. Therefore, in the bearing clearance comprising the bearing, gas is fundamentally a lubricating medium, but the liquid condensed through this isothermal compression is prone to becoming a lubricating film.

A shear force τ that acts between the bearing surface (the outer circumferential surface of the fixed shaft 210 and the inner circumferential surface of the rotating sleeve 220 in FIG. 18(a)) and the lubricating medium is represented in the formula $\tau = \mu \times du/dh$, with u representing the circumferential velocity of the rotating shaft and h representing the clearance interval. Here, $\mu$ is a coefficient of the viscosity of the lubricating medium and the value of this $\mu$ is at least 1,000 times higher in liquid compared to gas. In other words, when the lubricating medium within the bearing is a liquid, a shear force at least 1,000 times higher than that obtained when the lubricating medium is a gas is generated. Therefore, when the condensation and liquefaction occur, a shear force at least 1,000 times higher than when the common lubricating medium is gas is generated on the bearing surface. Thus, in addition to the resulting 1,000-fold or higher friction loss of the bearing, there is a problem in which this large shear force damages and exfoliates the bearing surface and the exfoliated portion of the bearing surface caused at this time fills the bearing clearance, causing the aerodynamic pressure bearing mechanism to be locked.

Therefore, investigations revealed that the ratio between the maximal pressure values and the minimal pressure values of the dynamic pressure that alternately changed with the number of herring bone grooves (intervals) changed in response to the number of the herring bone grooves (intervals), and as the number of grooves generating dynamic pressure decreased, the minimal pressure values decreased, and even if the number was low, the rotational stability could be maintained.

For example, FIG. 19 is a diagram in which in a case of three pairs of herring bone grooves 210a totaling six grooves (a total of six grooves with three grooves symmetrically placed on each end in the axial direction of the fixed shaft 210 about the center in the axial direction), wherein the horizontal axis indicates positions in the circumferential direction of the fixed shaft 210, the vertical axis, indicates pressure intensity, and the solid line indicates pressure distribution at an arbitrary time T. A fixed-point observation of the change in pressure from time T to time T+Δt the star symbol of the horizontal axis shows that the maximal pressure values and the minimal pressure values of the pressure continue to change in alternation. In addition, the steam is condensed through the pressure indicating the maximal pressure values and forms liquid particles (the star symbol) at time T, whereas the condensation is eliminated by the rapid decrease of the pressure at the time (T+Δt) indicating the minimal pressure values, and the liquid particles are evaporated again.

FIG. 20 is an example with 15 pairs of herring bone grooves 210a totaling 30 grooves, wherein the other elements have the same coordinates as in FIG. 19. In FIG. 20, compared to FIG. 19, the difference between the minimal pressure values and the maximal pressure values is reduced and the entire pressure distribution is moved to the high-pressure side. Therefore, the steam is condensed at the maximal pressure values of the pressure and forms liquid particles (the star symbol) at time T in FIG. 20, but because the minimal pressure values are high and are hardly decreased at the time (T+Δt), so the liquid particles tend to be hardly evaporated and remain as liquid particles (the star symbol).

In addition, the liquid particles condensed through isothermal compression due to the rotation in FIG. 20 gradually become particles with large diameters while moving in the circumferential direction as shown in FIG. 21 and forms a liquid film, causing a disturbance in which the shear force of the liquid damages and exfoliates the surface of the fixed shaft 210 and the exfoliated portion of the surface of the fixed shaft 210 caused at this time fills the bearing clearance, causing the aerodynamic pressure bearing mechanism 200 to be locked. However, as described above, in FIG. 19, such a disturbance may be prevented.

To accomplish this, as in FIG. 19, the minimal pressure values must be values less than the pressure at which condensation occurs, and for this, it can be understood that it is preferable to have fewer herring bone grooves 210a.

The objective of the present invention is to provide, based on the results of the abovementioned investigation, a motor provided with an aerodynamic pressure bearing mechanism that has a simple configuration and can prevent a change from condensation to a liquid by adopting a groove configuration in which even if condensation occurs at maximal pressure values, the dynamic pressure enters a range of pressure values that prevents condensation or eliminates condensation at subsequent minimal pressure values of the dynamic pressure.

Means of Solving the Problem

The invention is a motor provided with an aerodynamic pressure bearing mechanism comprising: a rotating axis; a fixed member having a surface facing the surface of the rotating axis with a predetermined bearing clearance; and herring bone grooves composed of N number of grooves placed on the surface of the rotating axis at regular intervals in the rotational direction and configured to generate dynamic pressure within said bearing clearance during rotation, wherein said herring bone grooves are composed of N number of grooves at positions where maximal pressure values of dynamic pressure variation in said bearing clearance caused during rotation of said rotating axis appears, and at intervals such that N number of minimal pressure values appearing in alternation with said maximal pressure values are lower than the condensation pressure value.

The invention is further the motor with the aerodynamic pressure bearing mechanism, wherein the N number of grooves composing said herring bone grooves are disposed at a predetermined intake angle $\beta$ ($0<\beta\leq 90°$) towards the center in the axial direction of the rotating axis with the edge of one end part in the axial direction of said rotating axis as one end of the grooves, and at a ratio between the length of said grooves in the axial direction and the axial diameter of the rotating axis being $\alpha$ ($0.2<\alpha<0.8$), wherein said grooves are composed of N number of grooves at intervals such that when rotating at a rotation frequency of M ($40<M\leq 60$: krpm for units) in an environment in which the ambient humidity is approximately 60% RH, at least said minimal pressure values become equal to or lower than 1.7 atm.

The invention is further the motor with the aerodynamic pressure bearing mechanism above, wherein the N is any integer from 3 to 5 when the rotating axis rotates with the M being approximately 60 (krpm).

The invention is also a motor that is used for rotating a scanning member for scanning with a laser light or a fan for blowing wind, the motor being attached to a rotating axis and provided with an aerodynamic pressure bearing mechanism, the mechanism comprising: said rotating axis; a fixed member having a surface facing the surface of the rotating axis with a predetermined bearing clearance; and herring bone grooves composed of N number of grooves placed on the surface of the rotating axis at regular intervals in the rotational direction and configured to generate dynamic pressure within said bearing clearance during rotation, wherein said herring bone grooves are composed of N number of grooves, and the respective grooves are disposed at an intake angle $\beta$ 30° towards the center in the axial direction of the rotating axis with the edge of one end part in the axial direction of said rotating axis as one end of the grooves and at a ratio $\alpha$ between the length of said grooves in the axial direction and the axial diameter of the rotating axis being in the range of approximately 0.2 to 0.8, wherein said grooves are composed of N number of grooves at positions where maximal pressure values of dynamic pressure variation in said bearing clearance caused during rotation at a rotation frequency of M ($40<M\leq 60$: krpm for units) in an environment in which the ambient temperature is approximately 60° C. or less and the ambient humidity is approximately 60% RH appear, and at intervals such that N number of minimal pressure values appearing in alternation with said maximal pressure values are equal to or lower than 1.7 atm.

The invention is further the motor described in the paragraph preceding the paragraph directly above, wherein the total of the lengths of circumferential components of each of the grooves placed at regular intervals in the circumferential direction is shorter than the circumferential length of the rotating axis.

The invention is further the motor described in the paragraph preceding the paragraph directly above, wherein the N is any integer from 3 to 5 when the rotating axis rotates with the M being approximately 60 (krpm).

Effects of the Invention

According to the present invention, herring bone grooves are provided in a rotating axis such that gas pressure distribution generated in the bearing clearance moves at a high speed, wherein the herring bone grooves consist of N number of grooves at intervals such that N number of minimal pressure values appearing in alternation with maximal pressure values at the positions where the maximal pressure values of dynamic pressure variation appear in the bearing clearance when the rotating axis rotates are lower than the condensation pressure value, and liquid particles condensed through isothermal compression are therefore evaporated again by decompression before forming a liquid film, creating an effect of preventing the formation of a liquid film. Therefore, a motor provided with a highly reliable aerodynamic pressure bearing mechanism that avoids the problem in which the shear force of the liquid condensed through the isothermal compression damages and exfoliates the bearing surface and the exfoliated portion of the surface caused at this time fills the bearing clearance and causes the bearing to be locked may be obtained.

EXPLANATION OF THE SYMBOLS

Figure 1A:
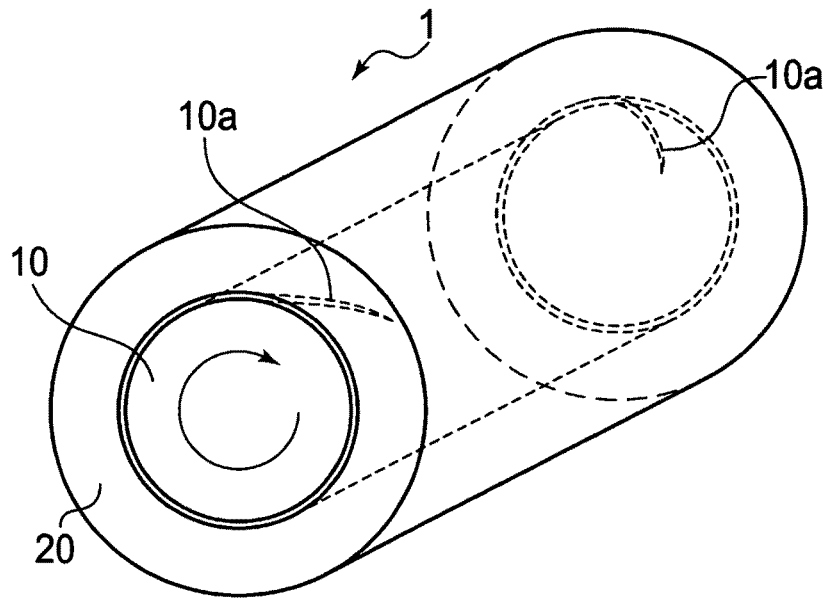
FIGS. 1(*a*) and (*b*) are respectively a perspective illustration of an aerodynamic pressure bearing mechanism according to Embodiment 1 of the present invention and a projected diagram of the outer circumferential surface of a shaft.

1: Aerodynamic pressure bearing mechanism
10: Shaft (Rotating axis)
10a, 10b, 10c: Herring bone grooves
20: Fixed sleeve (fixed member)
30: Fixed shaft (fixed member)
31: Bush
32: Circuit substrate
33: Winding
34: Axial magnet
40: Rotating sleeve (rotating axis)
41: Hub
42: Polygon mirror
43: Mirror-retaining spring
44, 45: Back yokes
46: Magnet
47: Axial magnet
48: Cover
300: Motor

DETAILED DESCRIPTION OF THE INVENTION

Figure 8:
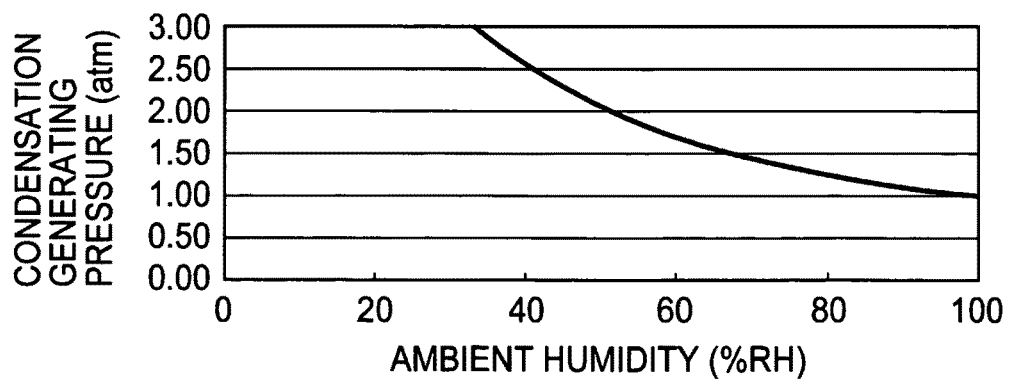
FIG. 8 is a graph illustrating condensation-generating pressure with isothermal compression.
Figure 19:
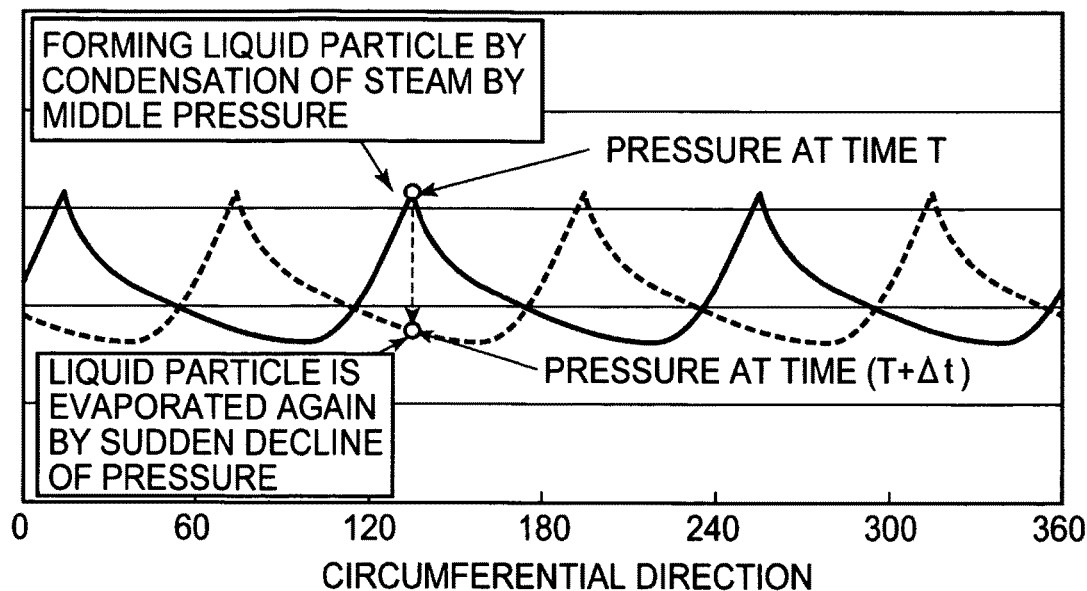
FIG. 19 is a graph illustrating the relationship between pressure distribution over time under medium pressure and the locations of condensed liquid particles.
Figure 20:
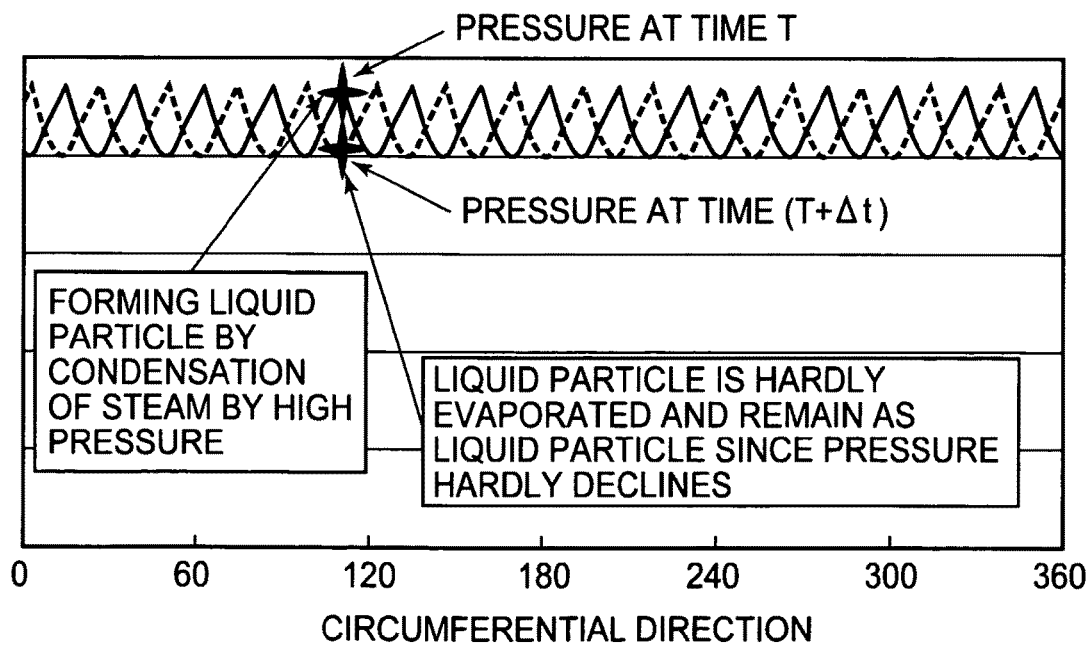
FIG. 20 is a graph illustrating the relationship between pressure distribution over time under high pressure and the locations of condensed liquid particles.
Figure 21:
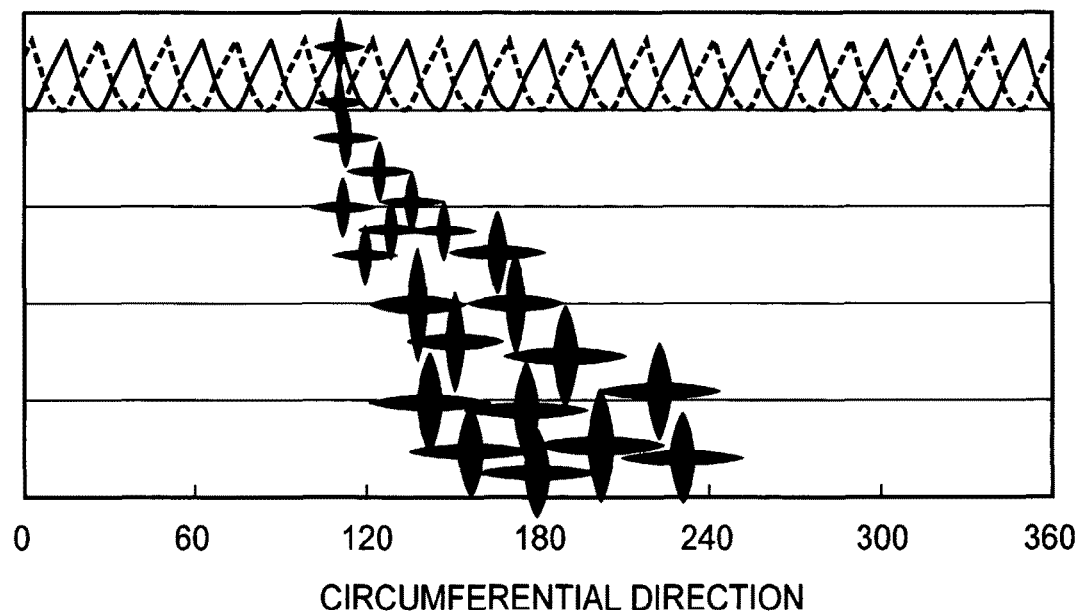
FIG. 21 is a graph illustrating the relationship between pressure distribution over time and the locations of condensed liquid particles.

The present invention provides a motor using a bearing mechanism with a structure in which no condensation occurs and even if condensation does occur, the condensation is eliminated. Therefore, before embodiments are explained, an environment (conditions), such as pressure at which condensation occurs, is explained based on FIG. 8. FIG. 8 has been obtained as information for ascertaining the tendencies of the pressure and condensation shown in FIG. 19 and FIG. 20 mentioned above. FIG. 8 shows the results of an investigation of the pressure at which condensation occurs through isothermal compression. The condensation-generating pressure Pc (hPa) is approximately 100×Po/U (hPa), wherein Po represents normal atmospheric pressure (1,013 hPa) and U represents a relative humidity (% RH). In a case of adiabatic compression, the internal temperature increases, the saturated vapor pressure increases, and the vapor pressure increases. However, it is believed that the saturated vapor pressure exceeds the vapor pressure, causing no condensation.

Therefore, it is important to create a state in which no condensation occurs in a state of isothermal compression.

According to FIG. 8, at a relative humidity RH of 60% in a state of use, the condensation-generating pressure is approximately 1.7 atm. Therefore, it is necessary to create a state, even temporarily, in which the pressure is below this pressure.

Embodiments of the present invention are described below in detail with reference to the drawings.

FIGS. 1(a) and (b) show simulated structures of Embodiment 1 for an aerodynamic pressure bearing mechanism 1 according to the present invention. Aerodynamic pressure bearing mechanisms with herring bone grooves include those with a rotating smoothing member type, in which a member with no grooves is fixed, and those with a rotating member with grooves type, in which a member with grooves rotates. The aerodynamic pressure bearing mechanism 1 according to the present embodiment 1 is a rotating member with grooves type.

Figure 1B:
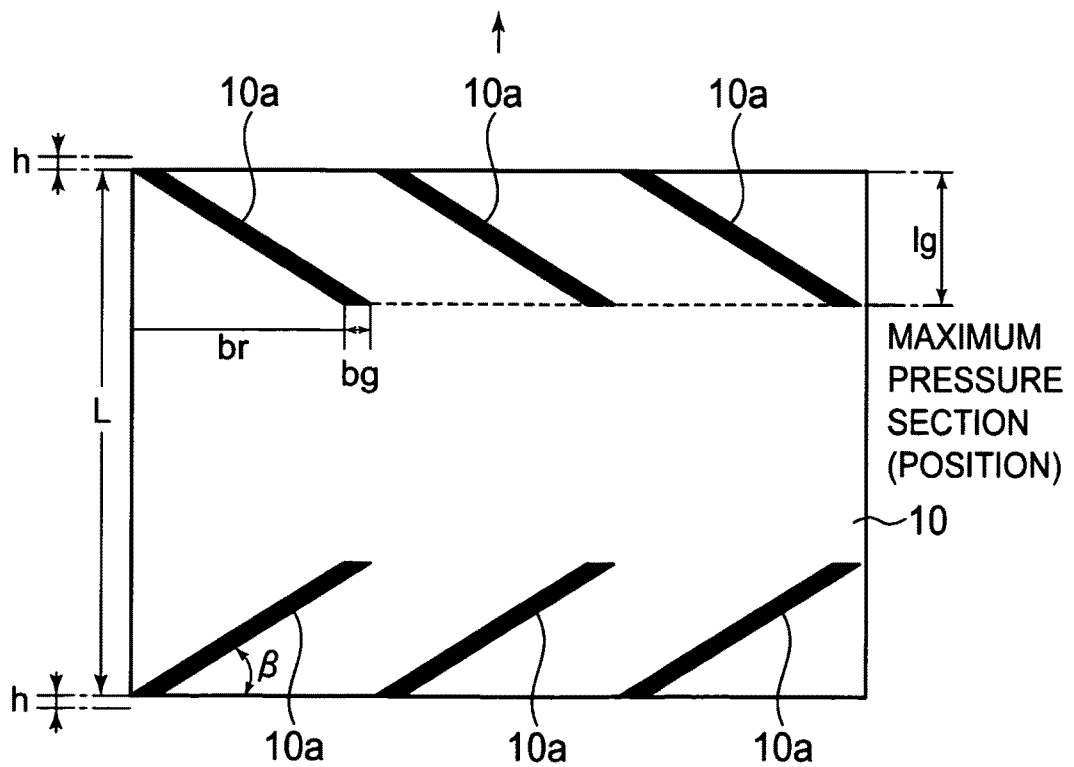

Specifically, in the aerodynamic pressure bearing mechanism 1 according to the present Embodiment 1, as shown in FIG. 1(a), a shaft with a herring bone groove 10a formed on the outer circumferential surface rotates, and a fixed sleeve 20 (fixed member) that has a cylindrical configuration enclosing the outer circumferential surface of the shaft 10 in the inside of the cylinder with a bearing clearance is fixed, wherein the fixed sleeve 20 is a member with no herring bone grooves. As shown in the projected diagram in FIG. 1(b) (a diagram of the shaft 10 being projected on a plane, wherein the vertical direction in FIG. 1(b) is the axial direction in FIG. 1(a)), a total of six herring bone grooves 10a are formed on the outer circumferential surface of the shaft 10, including: three grooves of a length lg on one end (one side) of the shaft 10 in the axial direction placed diagonally at a groove angle β with the end as one end; and three other grooves symmetrical about the center part in the axial direction (around ½ of the shaft length L in FIG. 1(b)).

This is a simple groove configuration with a few grooves and can therefore be produced at low cost. In other words, on the outer circumferential surfaces on both ends of the shaft 10 in the axial direction, three pairs of herring bone grooves 10a totaling six grooves that have groove lengths of lg in the axial direction are formed, and the inner pressure of the bearing is higher than the ambient pressure even in a noneccentric state due to the pumping effect of the herring bone grooves 10a, resulting in sufficient rigidity and high-speed stability.

The aerodynamic pressure bearing mechanism 1 according to the present Embodiment 1 is an aerodynamic pressure bearing mechanism for causing smooth rotary motion of the shaft 10 by feeding gas to the bearing clearance between the shaft 10 and the fixed sleeve 20 for supporting the shaft 10 through the herring bone grooves 10a, wherein the herring bone grooves 10a placed on the ends of the shaft 10 in the circumferential direction are placed apart in the circumferential distance such that before liquid particles condensed through isothermal compression caused by rotation of the shaft 10 are accumulated to form a liquid film, no liquid film will be formed due to evaporation again by decompression. Elements for determining the conditions include the number and shape of the grooves. In Embodiment 1, the minimum number is three grooves on one side and they are placed at regular intervals.

As following, the aerodynamic pressure bearing mechanism 1 with three pairs of herring bone grooves 10a totaling six grooves, in which the number of grooves has been reduced for the aerodynamic pressure bearing mechanism 1 so that the herring bone grooves 10a may be easily formed, is adopted for a motor, and a bearing is suggested that can be sufficiently used to rotate a polygon mirror for a laser scanner attached to a shaft 10 of the motor in order to elucidate the static properties and the high-speed stability through numerical calculations and experiments.

Figure 2:
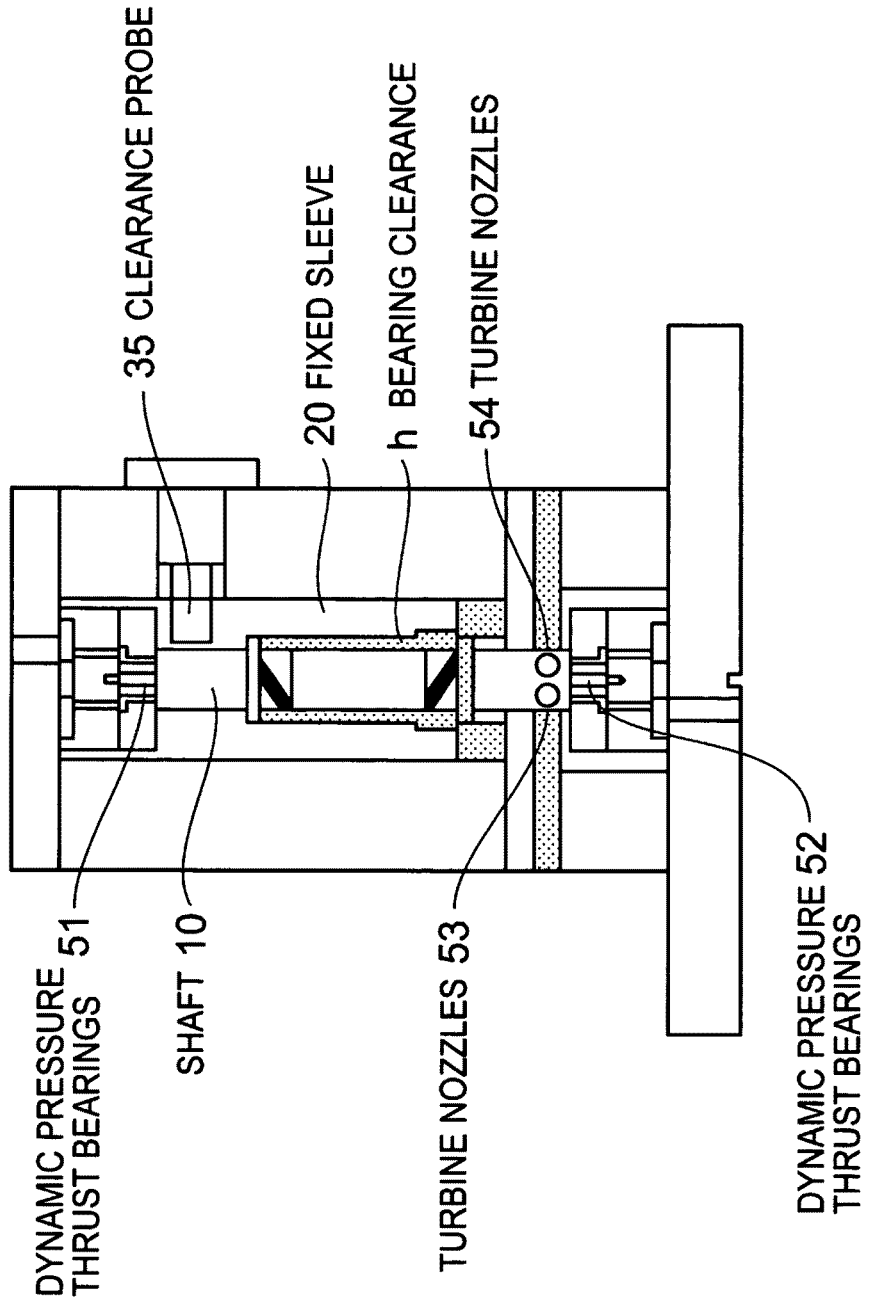
FIG. 2 is a diagram schematically illustrating an experimental apparatus.

FIG. 2 schematically shows major parts of an experimental apparatus for testing the aerodynamic pressure bearing mechanism 1 of FIG. 1. In the experimental apparatus of FIG. 2, the shaft 10 is supported by one fixed sleeve 20. In FIG. 2, dynamic pressure thrust bearings 51, 52 are bearing mechanisms for supporting the shaft 10 in the vertical direction in FIG. 2, turbine nozzles 53, 54 are gas inlets, and a clearance probe 35 is a probe for measuring the bearing clearance h between the outer circumferential surface of the shaft 10 and the inner circumferential surface of the fixed sleeve 20. A bearing test and a simulation were conducted according to FIG. 2.

Bearing data of the fixed sleeve 20 and the shaft 10 used therefor are shown in Table 1. In Table 1, "grooves" refers to the herring bone grooves 10a. Furthermore, the bearing clearance (clearance interval) h was changed by using different diameters for the shaft 10.

TABLE 1

Bearing and shaft data

| | |
|---|---|
| Shaft diameter; D [mm] | 12.005 |
| Shaft length; L [mm] | 34.1 |
| Bearing clearance h; h [μm] | 3.5, 5.5, 7.5 |
| Number of grooves: ng | 3 |
| Groove angle (intake angle): β [deg.] | 30 |
| Groove depth; δ [μm] | 3 |
| Ratio of groove width; bg/(bg + br) | 0.1 |
| Ratio of groove length; 2l g/L | 0.29 |
| Ratio α of groove length/diameter; l g/D | 0.41 |
| Mass m of shaft; [g] | 69.5 |
| Principal moment of inertia It; [kgm$^2$] | 3.77 × 10$^{-5}$ |
| Polar moment of inertia Ip; [kgm$^2$] | 1.25 × 10$^{-6}$ |

For the symbols used in the main data in Table 1, symbols identical to those used in FIGS. 1(a) and (b) indicate the same items. In Table 1, "grooves" refers to the herring bone grooves 10a. The bearing clearance h is the clearance interval between the outer circumferential surface of the shaft 10 and the inner circumferential surface of the fixed sleeve 20. The number of grooves ng is the number of the herring bone grooves 10a counted in pairs when they are symmetrically placed on both ends of the shaft 10 in the axial direction. For example, in the case shown in FIG. 1(b), ng is three grooves. The groove angle βg (also referred to as the intake angle) is the angle of intersection by the herring bone groove 10a and a line in the circumferential direction of the shaft 10. The ratio of groove width is obtained from the circumferential length br of the herring bone groove 10a and the circumferential width bg of the herring bone groove 10a as shown in Table 1.

Next, based on the data in Table 1, the pressure distribution is obtained and discussed by conducting a bearing simulation (experiment). Furthermore, in the bearing simulation, conditions such as the number of herring bone grooves ng are changed and obtained based on the data in Table 1, and conditions such as rotation frequency are also added and obtained.

In the bearing simulation, the following conditions were considered and obtained by applying the Navier-Stokes equations to a viscous fluid.

(1) Compared to the other directions (x and y directions of the space of the bearing clearance h) within the bearing (indicating the space of the bearing clearance h), the clearance direction (z direction) is sufficiently small and can be treated as two dimensions.

(2) The gas flow within the bearing is a fully developed flow of a boundary layer.

(3) Forces acting on the gas include a force exerted by a pressure gradient and a viscous force, while inertia force is ignored, and for the viscous force, only a shear force is considered and other forces are ignored.

The pressure was obtained through calculations with a basic equation (Equation 1) for the bearing simulation, which is the Reynolds equation, derived from the above conditions.

$$\frac{\partial}{\partial x}\left(\frac{\rho h^3}{\mu}\frac{\partial p}{\partial x}\right) + \frac{\partial}{\partial y}\left(\frac{\rho h^3}{\mu}\frac{\partial p}{\partial y}\right) = 6\left(U\frac{\partial}{\partial x}(\rho h) + 2\frac{\partial}{\partial t}(\rho h)\right) \quad \text{[Equation 1]}$$

Here, x and y represent 2D coordinates in which the clearance interval h is developed, ρ represents gas density, p represents pressure, h represents the clearance interval, μ represents a coefficient of the gas viscosity, U represents gas velocity, and t represents time.

In a calculation of the static characteristics, after supposing a condition of mass flow continuity in minute lattices, the calculation was conducted with a divergence formulation method using a boundary fitting method. This allowed for considering the effects of the number of grooves. A load capacity w when the shaft 10 has an eccentricity ratio ε is obtained by integrating the obtained pressure distribution within the bearing. However, a dimensionless load capacity W is W=w/(p$_a$LD), wherein p$_a$ represents ambient pressure.

Figure 3:
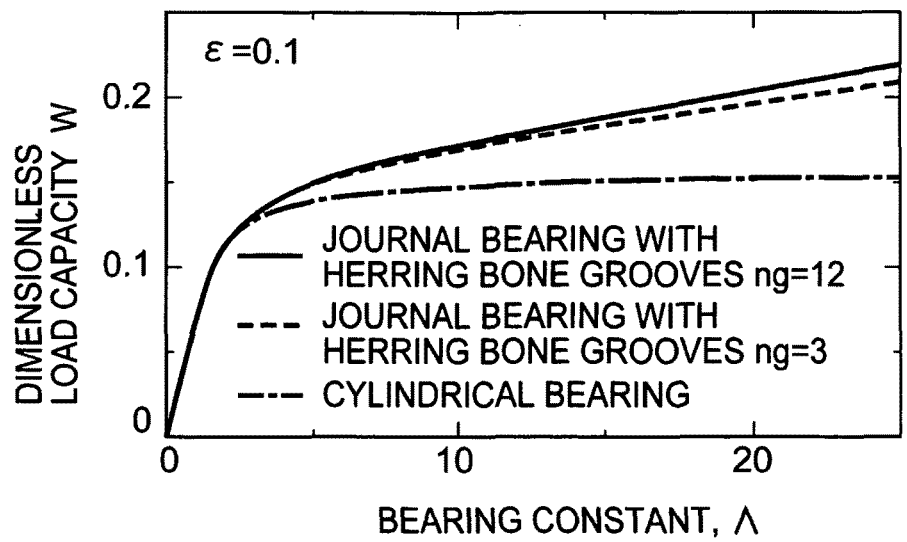
FIG. 3 is a graph illustrating the relationship between a bearing multiplier and a dimensionless load capacity.

FIG. 3 shows a comparison of the dimensionless load capacity W between a bearing with herring bone grooves 10a ("herring bone" may hereinafter be referred to as "HB") and a cylindrical bearing based on numerical calculations. Basic bearing data is as shown in Table 1. Based on FIG. 3, it is clear that the HB bearing, compared to the cylindrical bearing, obtains a higher dimensionless load capacity W as a bearing constant Λ becomes larger. Moreover, in the bearing data shown in Table 1, it can be said that the difference in the dimensionless load capacity W made by the difference between the numbers of HB grooves ng of 3 and 12 is small.

Figure 4:
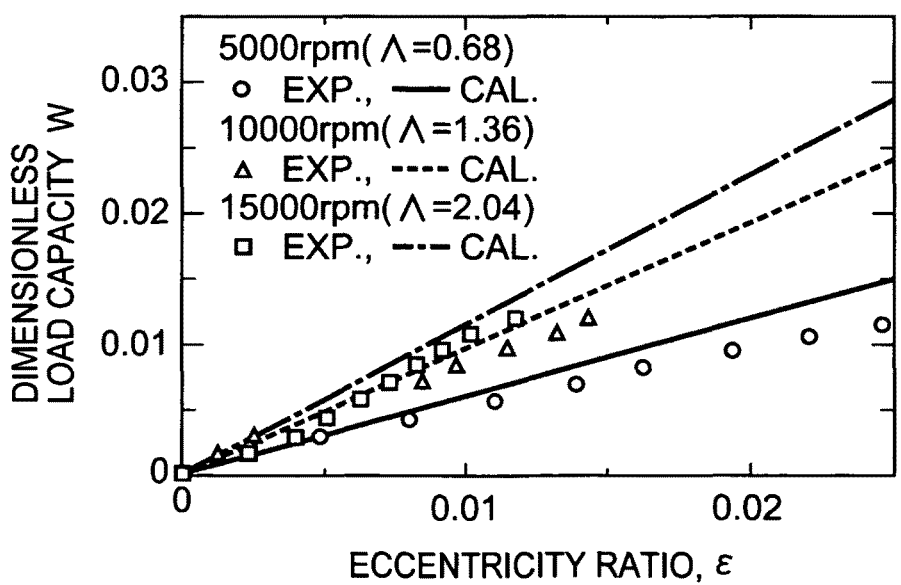
FIG. 4 is a graph illustrating the relationship between eccentricity ratio and dimensionless load capacity.

In FIG. 4, the eccentricity ratio ε when the clearance interval h of the aerodynamic pressure bearing mechanism 1 with three pairs of herring bone grooves 10a totaling six groves is 5.5 μm is shown along with comparisons of the experimental results of the dimensionless load capacity W ("ExP" in FIG. 4) and the numerical calculations ("CAL" in FIG. 4). In this experiment, a load in the bearing direction is generated by tilting the experimental apparatus shown in FIG. 2.

Moreover, the eccentricity ratio ε of the shaft 10 with respect to the load was obtained by measuring the displacement of the shaft 10 at this time using a contactless displacement gauge. According to FIG. 4, the experimental results and the calculation results are substantially consistent.

For the calculation of stability, the shaft center trajectory was obtained using a nonlinear orbital method by applying a motion equation considering angular displacement and parallel displacement.

In the nonlinear orbital method, when the shaft center trajectory of the shaft 10 converges on the shaft center, it is determined to be stable, whereas when it moves away from the shaft center, it is determined to be unstable. Furthermore, the shaft 10 generates an unstable state caused by a deflection rotation referred to as a whirl (HFW) during high-speed rotation.

Figure 5:
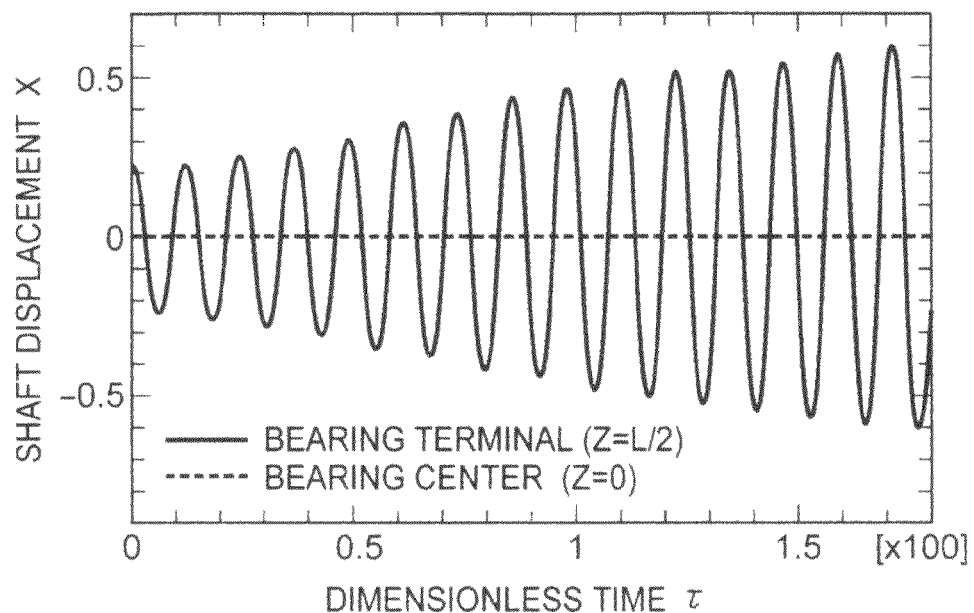
FIG. 5 is a graph illustrating the relationship between dimensionless time and shaft displacement.

In FIG. 5, displacement of the shaft center in the X direction based on the numerical calculation of the bearing data shown in Table 1 is shown. FIG. 5 shows the displacement of the shaft center in the X direction at Z=0 (shaft center) and Z=L/2 (bearing end) when the clearance interval h is 7.5 μm and the shaft rotation frequency is 20 krpm. With reference to FIG. 5, it is clear that the displacement of the shaft 10 is greater at the bearing end than at the shaft center, showing a conical mode with angular displacement.

Figure 6:
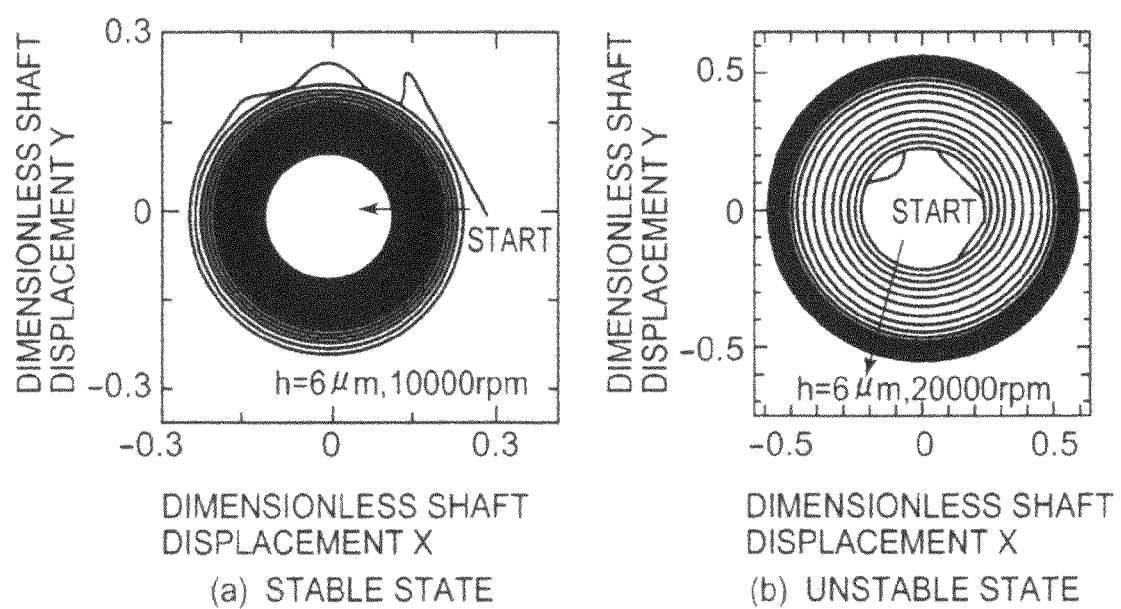
FIGS. 6(*a*) and (*b*) are diagrams respectively illustrating a stable state and an unstable state of a shaft center trajectory.

FIG. 6 shows the shaft center trajectory of the shaft 10 calculated with the nonlinear orbital method in the bearing data shown in Table 1. FIG. 6(a) shows a case in which the shaft 10 is in a stable state and the shaft center trajectory converges on the shaft center. In contrast, FIG. 6(b) shows a case of an unstable state, wherein the shaft center trajectory becomes larger from the shaft center toward the outside. The whirl in the conical mode with the angular displacement as shown in FIG. 5 is larger at the bearing end than at the shaft center. Based on this, the shaft center trajectory at the bearing end was used to determine the stability of the shaft 10 in the present Embodiment 1.

Figure 7:
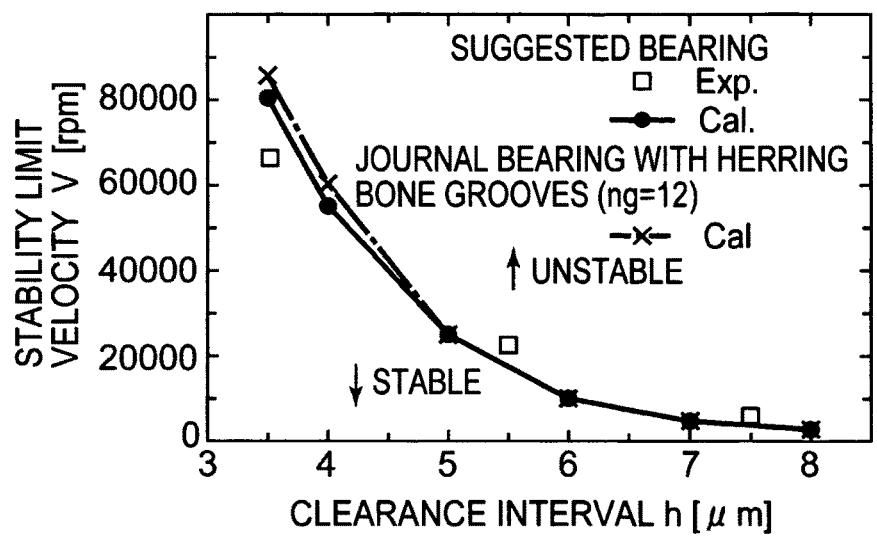
FIG. 7 is a graph illustrating the relationship between clearance interval and stability limit velocity.

FIG. 7 shows the results of the experiment and the numerical calculations for stability in the fixed sleeve 20 and the shaft 10 shown in Table 1 (number of HB grooves ng=3 as one of the suggested bearings). The stability limit velocity V in the experiment was measured immediately before the whirl (HFW) was generated.

Moreover, to conduct the experiment in a noneccentric state, the shaft 10 was placed vertically. The experimental results ("Exp" in FIG. 7) and the calculation results ("CAL" in FIG. 7) are substantially consistent, and it is clear that as the clearance interval h decreases, the stability limit velocity V increases. Moreover, the mass of the rotating body used for the actual laser scanner is approximately 30 g, which is lighter than the shaft 10 used for the experiment. Based on this, it can be said that the aerodynamic pressure bearing mechanism 1 with three pairs of herring bone grooves 10a totaling six grooves has sufficient high-speed stability.

In addition, FIG. 7 also shows the stability limit velocity V obtained by a numerical calculation of an aerodynamic pressure bearing mechanism with the number of HB grooves ng being 12 in the bearing data shown in Table 1. FIG. 7 clarifies that differences in the stability limit velocity V made by differences in the number of HB grooves are small in the bearing data shown in Table 1.

In the present Embodiment 1, the static properties and the high-speed stability of the aerodynamic pressure bearing mechanism 1 with three pairs of herring bone grooves 10a totaling six grooves were experimentally and numerically elucidated. The results indicated the following findings.

(1) Based on the experiment and the numerical calculations, it was discovered that the aerodynamic pressure bearing mechanism 1 with three pairs of herring bone grooves 10a totaling six grooves obtains a very high dimensionless load capacity W. Moreover, it was discovered that the dimensionless load capacity W exhibited a small difference from that of an aerodynamic pressure bearing mechanism with many herring bone grooves and had sufficient performance as a laser scanner bearing.

(2) Under the condition shown in the present Embodiment 1, the stability limit velocity V of the aerodynamic pressure bearing mechanism 1 with three pairs of herring bone grooves 10a totaling six grooves has stability at over 60 krpm when the clearance interval h is 3.5 μm. Therefore, it was discovered that the aerodynamic pressure bearing mechanism 1 according to the present Embodiment 1 had sufficient stability at high speed as a laser scanner bearing.

Next, the pressure distribution within the bearing will be explained. The maximal values of pressure distribution within the bearing are shown at a maximal pressure cross-section position in FIG. 1(b) (i.e., a position toward the interior from the end of the shaft 10 by the length lg of the HB grooves 10a in the axial direction). It is shown only on one side in FIG. 1(b), but it is generated on both sides.

In other words, at a position that is toward the interior from the end of the shaft 10 by a distance lg, when the HB groove 10a moves to the position in response to a rotation, the maximal value is shown, and when it moves to the middle between the HB groove 10a and an HB groove 10a adjacent thereto, the minimal value is shown.

Figure 9:
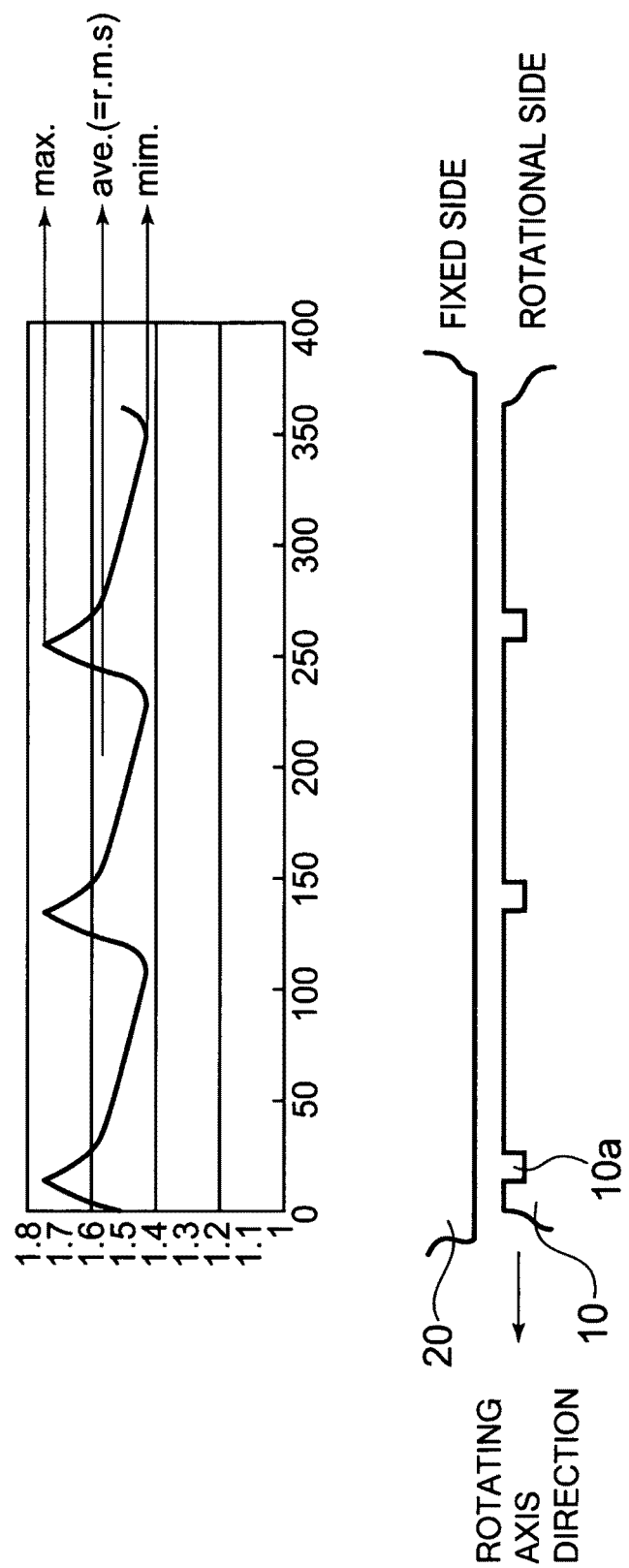
FIG. 9 is a graph illustrating variation in pressure.

The diagram of the pressure distribution is shown in FIG. 9. FIG. 9 shows the pressure distribution on coordinates with the horizontal axis representing the circumferential direction of the shaft 10 and the vertical axis representing the pressure (atm). If the pressure is observed with the abovementioned maximal-pressure cross-sectional position fixed, changes in the pressure value shown with the pressure distribution in FIG. 9 are subjected to the rotation of the shaft 10.

When the aerodynamic pressure bearing mechanism 1 with HB grooves 10a with an ng of 3 is rotated as mentioned above, as shown in FIG. 9, the pressure changes in a pulsative manner, and the maximal pressure values (max.) exceed the condensation-generating pressure value of approximately 1.7 atm and may cause condensation, but the pressure immediately decreases to the condensation-generating pressure value of approximately 1.7 or less, and the condensation is thereby eliminated and evaporated.

Next, as shown in the following (a) to (c), the pressure distribution is investigated when the number of HB grooves is changed from 3 to 15 under conditions in which some of the data, such as the diameter of the shaft 10 and the rotation frequency, have been changed and under the same conditions.

(a) An experiment was conducted with a rotation frequency of 60 krpm and a rotation frequency of 70 krpm in the aerodynamic pressure bearing mechanism 1 with the main data shown in Table 2.

TABLE 2

| | |
|---|---|
| Shaft diameter; D [mm] | 8 |
| Shaft length; L [mm] | 12.3 |
| Bearing clearance; h [μm] | 2.5 |
| Number of grooves: ng | 3-15 |
| Groove angle (intake angle) = β[deg.] | 30 |
| Groove depth; δ [μm] | 8 |
| Circumferential length of groove; bg [mm} | 2.7 (one side) |
| Ratio α of groove length/diameter; l g/D | 0.41 |

Figure 10:
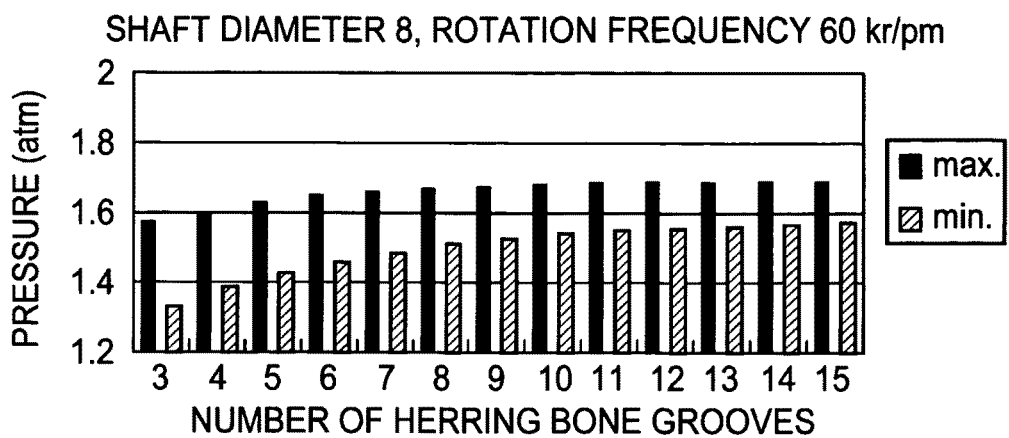
FIG. 10 is a bar graph illustrating maximum pressure values and minimum pressure values according to the number of HB grooves when a shaft with a shaft diameter of 8 mm is rotated at a rotation frequency of 60 krpm.

When the shaft 10 with a shaft diameter of 8 mm was rotated at a rotation frequency of 60 krpm, the maximal pressure values (max.) and minimal pressure values (min.) shown in FIG. 10 were obtained in accordance with the number of HB grooves 10a. Under the conditions of Table 2, all of the minimal pressure values (min.) are 1.7 atm or less regardless of the number of HB grooves 10a, and it is clear that even if liquid particles are generated, they will be immediately evaporated.

Figure 11:
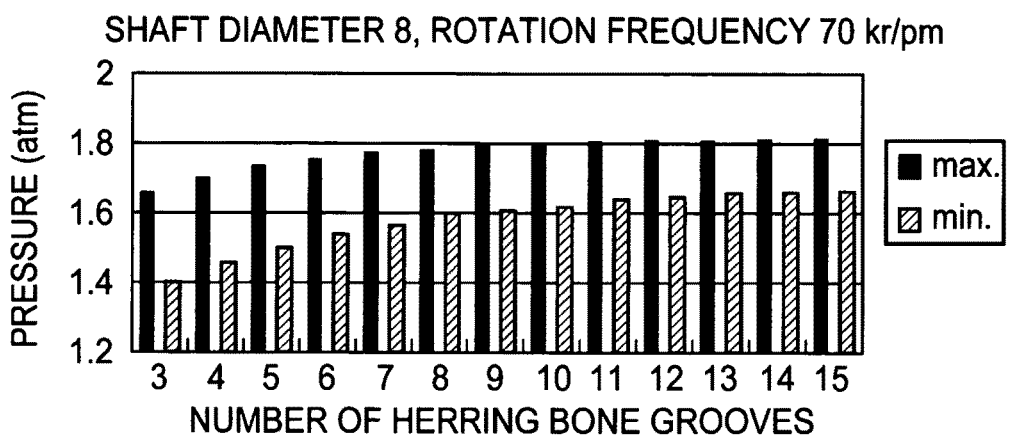
FIG. 11 is a bar graph illustrating maximum pressure values and minimum pressure values according to the number of HB grooves when a shaft with a shaft diameter of 8 mm is rotated at a rotation frequency of 70 krpm.

Moreover, when the shaft 10 with a shaft diameter of 8 mm was rotated at a rotation frequency of 70 krpm, the maximal pressure values (max.) and minimal pressure values (min.) shown in FIG. 11 were obtained in accordance with the number of HB grooves 10a.

Under the conditions of Table 2, all of the minimal pressure values (min.) are 1.7 atm or less regardless of the number of HB grooves 10a, and it is clear that even if liquid particles are generated, they will be immediately evaporated.

(b) Next, an experiment was conducted at a rotation frequency of 60 krpm and a rotation frequency of 70 krpm in the aerodynamic pressure bearing mechanism 1 with the main data shown in Table 2.

TABLE 3

| | |
|---|---|
| Shaft diameter; D [mm] | 9 |
| Shaft length; L [mm] | 12.3 |
| Bearing clearance; h [μm] | 2.5 |
| Number of grooves: ng | 3-15 |
| Groove angle (intake angle) = β[deg.] | 30 |
| Groove depth; δ [μm] | 8 |
| Circumferential length of groove; bg [mm} | 2.7 (one side) |
| Ratio α of groove length/diameter; 1 g/D | 0.41 |

Figure 12:
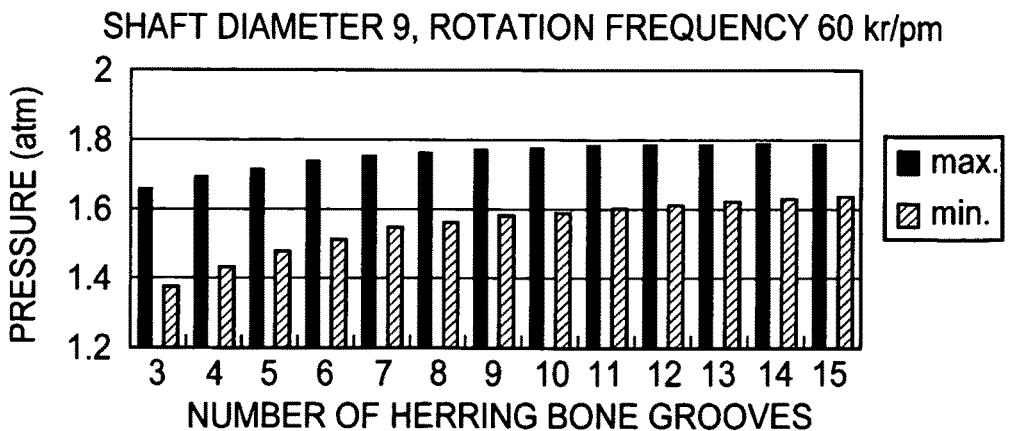
FIG. 12 is a bar graph illustrating maximum pressure values and minimum pressure values according to the number of HB grooves when a shaft with a shaft diameter of 9 mm is rotated at a rotation frequency of 60 krpm.

When the shaft 10 with a shaft diameter of 9 mm was rotated at a rotation frequency of 60 krpm, the maximal pressure values (max.) and minimal pressure values (min.) shown in FIG. 12 were obtained in accordance with the number of HB grooves 10a. Under the conditions of Table 3, all of the minimal pressure values (min.) are 1.7 atm or less regardless of the number of HB grooves 10a, and it is clear that even if liquid particles are generated, they will be immediately evaporated.

Figure 13:
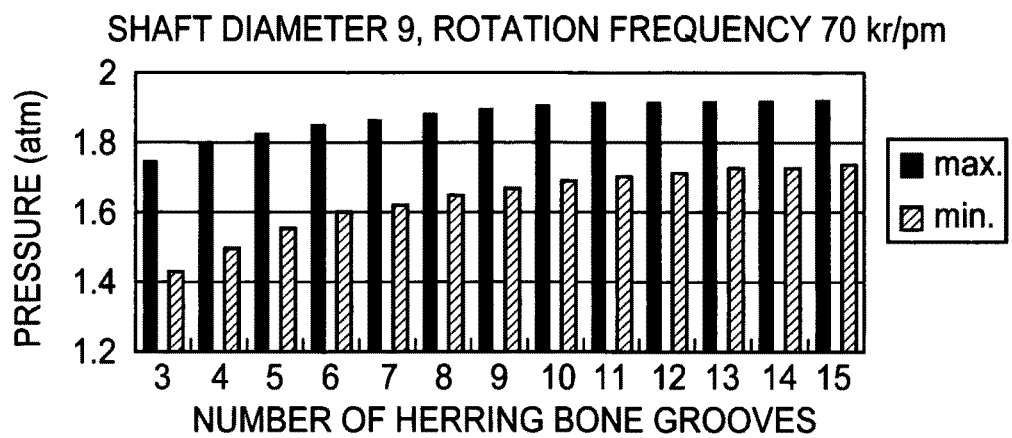
FIG. 13 is a bar graph illustrating maximum pressure values and minimum pressure values according to the number of HB grooves when a shaft with a shaft diameter of 9 mm is rotated at a rotation frequency of 70 krpm.

Moreover, when the shaft 10 with a shaft diameter of 9 mm was rotated at a rotation frequency of 70 krpm, the maximal pressure values (max.) and minimal pressure values (min.) shown in FIG. 13 were obtained in accordance with the number of HB grooves 10a.

Under the conditions of Table 3 as well, when the number of the HB grooves 10a is 10 or more, the minimal pressure values (min.) exceed 1.7 atm, and liquid particles condensed through isothermal compression may not be completely evaporated and may be accumulated and remain. Therefore, it is clear that in order to avoid the problem of condensation under these conditions, it is preferable that the number of HB grooves 10a is 10 or less.

(c) Subsequently, an experiment was conducted at a rotation frequency of 50 krpm and a rotation frequency of 60 krpm in the aerodynamic pressure bearing mechanism 1 with the main data shown in Table 2.

TABLE 4

| | |
|---|---|
| Shaft diameter; D [mm] | 14 |
| Shaft length; L [mm] | 12.3 |
| Bearing clearance; h [μm] | 3.5 |
| Number of grooves: ng | 3-15 |
| Groove angle (intake angle) = β [deg.] | 30 |
| Groove depth; δ [μm] | 8 |
| Circumferential length of groove; bg [mm} | 2.7 (one side) |
| Ratio α of groove length/diameter; 1 g/D | 0.41 |

Figure 14:
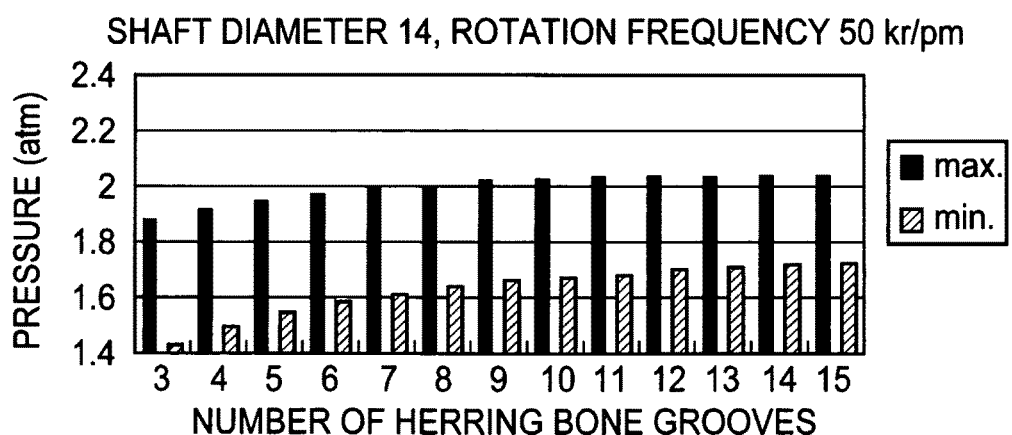
FIG. 14 is a bar graph illustrating maximum pressure values and minimum pressure values according to the number of HB grooves when a shaft with a shaft diameter of 14 mm is rotated at a rotation frequency of 50 krpm.

When the shaft 10 with a shaft diameter of 14 mm was rotated at a rotation frequency of 50 krpm, the maximal pressure values (max.) and minimal pressure values (min.) shown in FIG. 14 were obtained in accordance with the number of HB grooves 10a. Under the conditions of Table 4, when the number of HB grooves 10a is 11 or more, the minimal pressure values (min.) exceed 1.7 atm or less, and liquid particles condensed through isothermal compression may not be completely evaporated and may be accumulated and remain.

Therefore, it is clear that in order to avoid the problem of condensation under these conditions, it is preferable that the number of HB grooves 10a is 11 or less.

Figure 15:
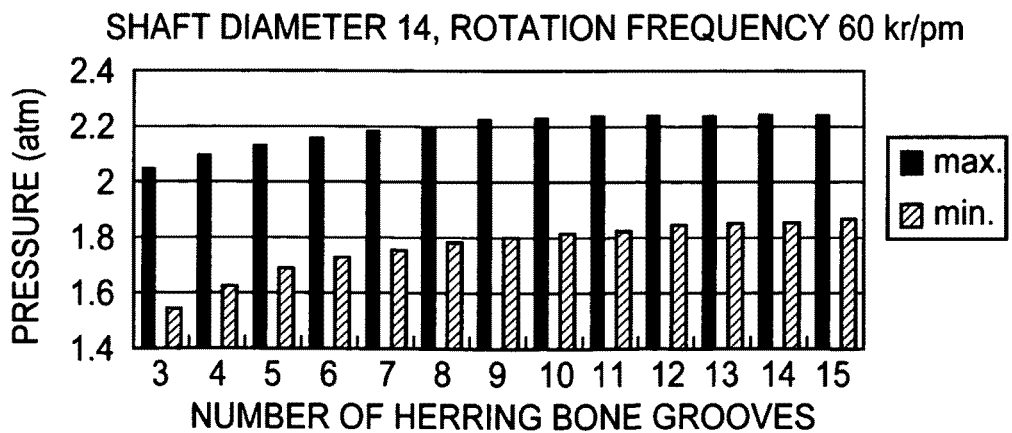
FIG. 15 is a bar graph illustrating maximum pressure values and minimum pressure values according to the number of HB grooves when a shaft with a shaft diameter of 14 mm is rotated at a rotation frequency of 60 krpm.

Moreover, when the shaft 10 with a shaft diameter of 14 mm was rotated at a rotation frequency of 60 krpm, the maximal pressure values (max.) and minimal pressure values (min.) shown in FIG. 15 were obtained in accordance with the number of HB grooves 10a.

Under the conditions of Table 4, when the number of HB grooves 10a is 5 or more, the minimal pressure values (min.) exceed 1.7 atm or less, and liquid particles condensed through isothermal compression may not be completely evaporated and may be accumulated and remain. Therefore, it is clear that in order to avoid the problem of condensation under these conditions, it is preferable that the number of HB grooves 10a is 5 or less.

Based on the above results, the following points can be claimed.

(1) According to the results of the bearing simulations, when the number of HB grooves 10a is 6 to 9, the maximal pressure values (max.) and the minimal pressure values (min.) tend to (greatly) decrease.

(2) It is supposed that the ambient humidity of 60% RH is considered to be a practical humidity to be used and the condensation-generating pressure is approximately 1.7 atm (according to the graph of the condensation-generating pressure in FIG. 8). Even if the bearing has a relatively large shaft diameter of 14 mm and if the number of HB grooves 10a is 5 or less, the occurrence of failures due to condensation can be prevented.

According to these simulations, under an environment with a predetermined intake angle β (0<β≦90°), in which the ratio between the length lg of the grooves in the axial direction and the shaft diameter D of the shaft, α=lg·D, is set to 0.2<α<0.8, the humidity during use is 40 to 60% RH, and the ambient humidity is 40 to 60% RH, usage conditions with a rotation frequency M (40<M≦60; krpm for units) are supposed. Then, it is clear that the number ng of HB grooves 10a must have an interval in which at least said minimal pressure values are 1.7 atm or less, and this requirement may be mostly satisfied by the number of grooves being 3 to 5.

In other words, in a case in which the number of HB grooves 10a is 5 or less, even if the maximal pressure values (max.) exceed the condensation-generating pressure, water for condensation cannot exist continuously unless the minimal pressure values (min.) reach the condensation-generating pressure, and therefore, the occurrence of failures due to condensation can be inhibited. In addition, when considering the maximal pressure cross-section in FIG. 1(b), the maximal and minimal pressure values typically appear at portions where the HB grooves 10a are formed, the apical ends in particular receive high maximal pressure values (max.), and the pressure at portions where the HB grooves 10a are not formed decreases.

Figure 16A:
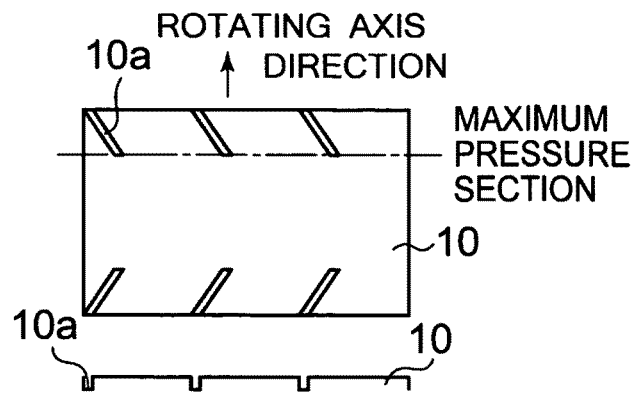
FIGS. 16(a), (b), and (c) are projected diagrams illustrating modified examples of the shapes of herring bone grooves.
Figure 16B:
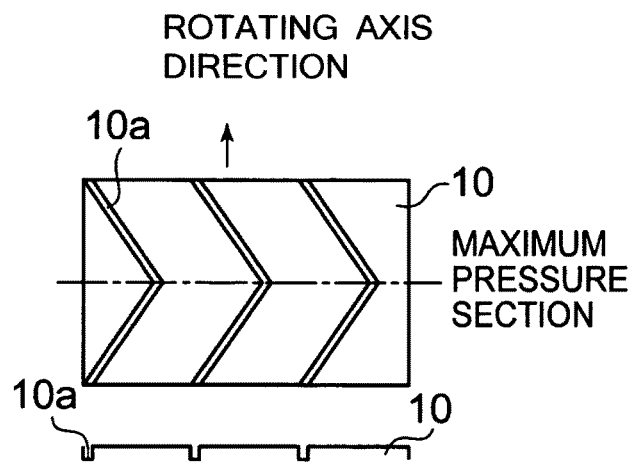
Figure 16C:
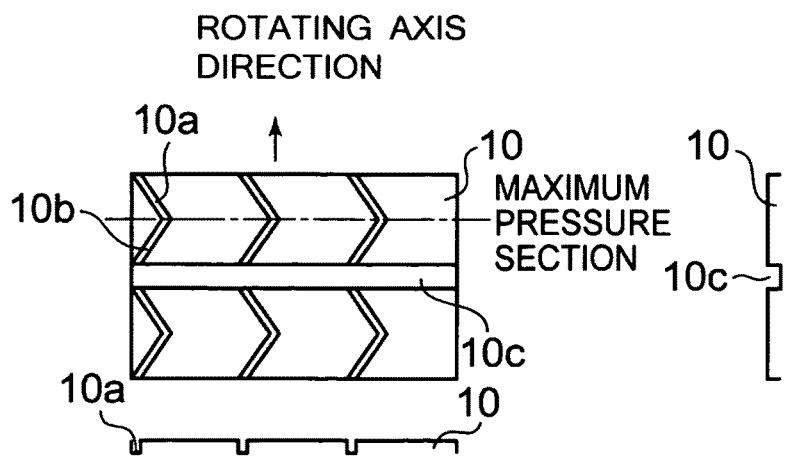

FIG. 16(a), (b) and (c) illustrate examples of the formation of herring bone grooves, but the grooves are not limited to these.

In the above Embodiment 1, the aerodynamic pressure bearing mechanism with herring bone grooves belongs to a type of a rotating member with grooves, wherein the shaft 10 rotates within the fixed sleeve 20, but in other mechanisms with the type of a rotating member with grooves, a rotating sleeve, which is a member with grooves, may be rotated around a fixed shaft, which is a member without grooves.

Figure 17:
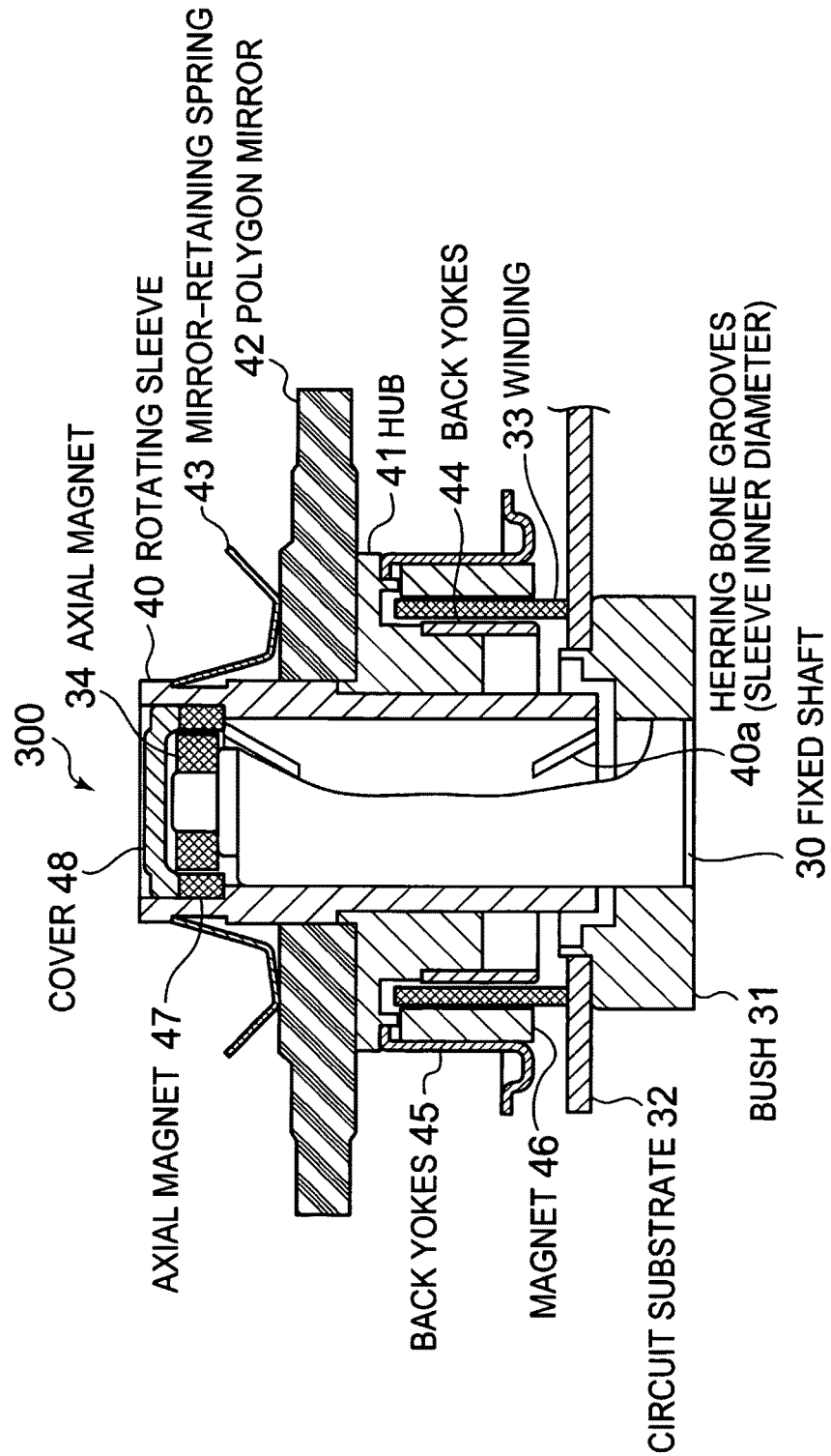
FIG. 17 is a cross-sectional view illustrating a motor according to Embodiment 2 of the present invention.
Figure 18A:
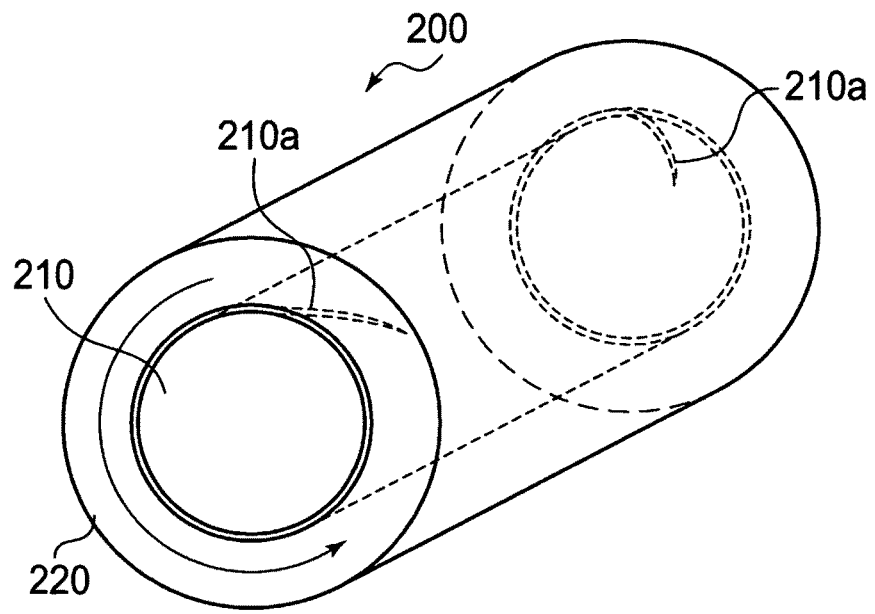
FIGS. 18(a) and (b) are respectively a perspective illustration of a conventional aerodynamic pressure bearing mechanism and a projected diagram of the outer circumferential surface of a fixed shaft.
Figure 18B:
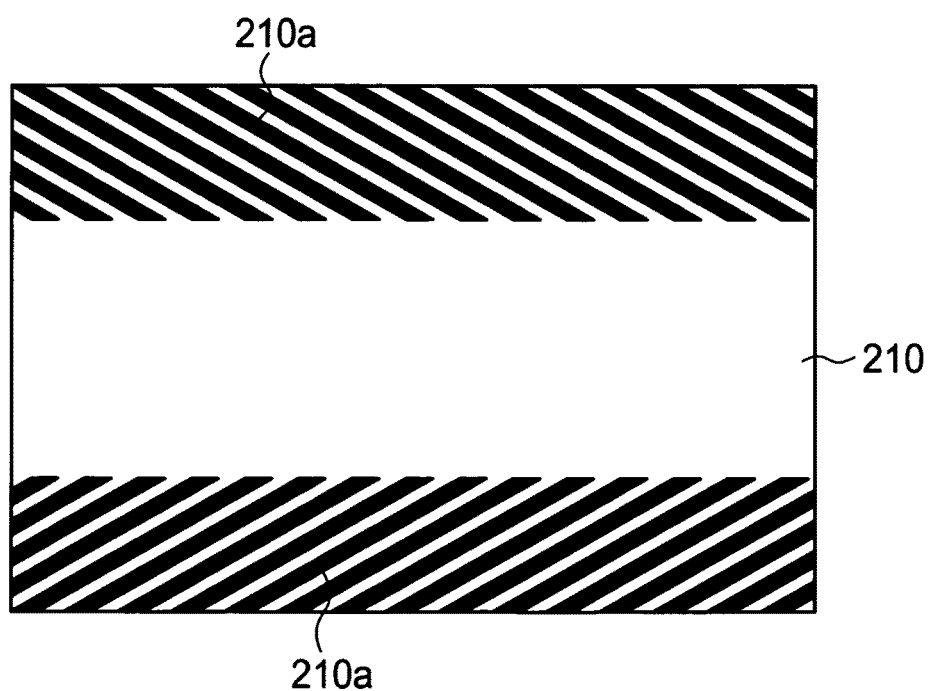

FIG. 17 is a cross-sectional view illustrating a motor 300 provided with an aerodynamic pressure bearing mechanism according to Embodiment 2 of the present invention. This motor 300 is a motor that is used for rotating a polygon mirror 42, which is a scanning member for scanning a laser light, attached to an apical end extending in the axial direction from a rotating sleeve 40 of the aerodynamic pressure bearing mechanism comprising: a fixing part composed of a fixed shaft 30 including a cylindrical body, a bush 31 for fixing the outer circumference at the lower end of the fixed shaft 30, a circuit substrate 32 attached to the bush 31, a winding 33 provided with the circuit substrate 32, and an axial magnet 34 fixed to the upper end of the fixed shaft 30; and a rotor composed of a rotating sleeve 40 rotatably engaged with the outer circumference of the fixed shaft 30, a hub 41 fixed in the middle of the outer circumference of the rotating sleeve 40, a polygon mirror 42 fixed to the hub 41, a mirror-retaining spring 43 for retaining the polygon mirror 42 to the hub 41, back yokes 44, 45 fixed to the lower end of the hub 41, a magnet 46 fixed to the back yoke 45, an axial magnet 47 fixed to the inner circumferential surface at the upper end of the rotating sleeve 40, and a cover 48 placed over the inner circumferential surface at the upper end of the rotating sleeve 40 so as to hide the axial magnet 47.

Three pairs of herring bone grooves 40a totaling six grooves are formed on the inner circumferential surface of the rotating sleeve 40.

In the motor 300 configured in such a manner, the herring bone grooves 40a are provided in the rotating sleeve 40 such that the gas pressure distribution generated in the bearing clearance moves at a high speed, wherein the herring bone grooves 40a consist of N number of grooves (e.g., 3 to 5) such that N number of minimal pressure values appearing in alternation with maximal pressure values are lower than the condensation pressure value at the positions where the maximal pressure values of dynamic pressure variation appear in the bearing clearance when the rotating sleeve 40 rotates.

Thus, liquid particles condensed through isothermal compression are thereby evaporated again by decompression before they accumulate and form a liquid film, creating an effect of preventing the formation of a liquid film. Therefore, the highly reliable motor 300 may be obtained that avoids the problem in which the shear force of the liquid condensed through the isothermal compression damages and exfoliates the bearing surface and causes the resultant exfoliated portion of the surface to fill the bearing clearance, which in turn causes the bearing to be locked.

Each embodiment of the present invention has been explained above, but these are only illustrative examples and the present invention is not limited to them, and various modifications based on the knowledge of those skilled in the art are possible as long as the purpose of the scope of claims is not deviated from.

What is claimed is:

1. A motor provided with an aerodynamic pressure bearing mechanism, the mechanism comprising: a rotating axis; a fixed member having a surface facing the surface of the rotating axis with a predetermined bearing clearance; and herring bone grooves composed of N number of grooves placed on the surface of the rotating axis at regular intervals in the rotational direction and configured to generate dynamic pressure within said bearing clearance during rotation, wherein the N number of grooves composing said herring bone grooves are disposed at a predetermined intake angle β greater than 0 and less than or equal to 90 degrees towards the center in the axial direction of the rotating axis with an edge of one end part in the axial direction of said rotating axis as one end of the grooves, and at a ratio between the length of said grooves in the axial direction and the axial diameter of the rotating axis being greater than 0.2 and less than 0.8, and wherein, when rotating at a rotation frequency of M greater than 40 krpm and less than or equal to 60 krpm in an environment in which the ambient humidity is approximately 60% RH, and wherein said herring bone grooves are composed of N number of grooves at positions where maximal pressure values of dynamic pressure variation in said bearing clearance caused during rotation of said rotating axis appears, and at intervals such that N number of minimal pressure values appearing in alternation with said maximal pressure values, said minimal pressure values become equal to or lower than 1.7 atm as a condensation pressure value.

2. The motor according to claim 1, wherein said N is any integer from 3 to 5.

3. A motor that is used for rotating a scanning member for scanning with a laser light or a fan for blowing wind, the motor being attached to a rotating axis and provided with an aerodynamic pressure bearing mechanism, the mechanism comprising: said rotating axis; a fixed member having a surface facing the surface of the rotating axis with a predetermined bearing clearance; and herring bone grooves composed of N number of grooves placed on the surface of the rotating axis at regular intervals in the rotational direction and configured to generate dynamic pressure within said bearing clearance during rotation, wherein said herring bone grooves are composed of N number of grooves, and the respective grooves are disposed at an intake angle β greater than 0 and less than or equal to 90 degrees towards the center in the axial direction of the rotating axis with the edge of one end part in the axial direction of said rotating axis as one end of the grooves and at a ratio a between the length of said grooves in the axial direction and the axial diameter of the rotating axis being in the range of approximately 0.2 to 0.8, wherein said grooves are composed of N number of grooves at positions where maximal pressure values of dynamic pressure variation in said bearing clearance caused during rotation at a rotation frequency of M greater than 40 krpm and less than or equal to 60 krpm in an environment in which the ambient temperature is approximately 60 degrees or less and the ambient humidity is approximately 60% RH appear, and at intervals such that N number of minimal pressure values appearing in alternation with said maximal pressure values are equal to or lower than 1.7 atm.

4. The motor according to claim 3, wherein the total of the lengths of circumferential components of said respective grooves placed at regular intervals in said circumferential direction is shorter than the circumferential length of said rotating axis.

5. The motor according to claim 3, wherein said N is any integer from 3 to 5.

6. The motor according to claim 3, wherein said N is any integer from 3 to 5, when said rotating axis rotates with said M being approximately 60 krpm.

* * * * *